May 27, 1924.
E. H. SCHMIDT
SHOCK ABSORBING MECHANISM
Filed April 5, 1920  2 Sheets-Sheet 1
1,495,263
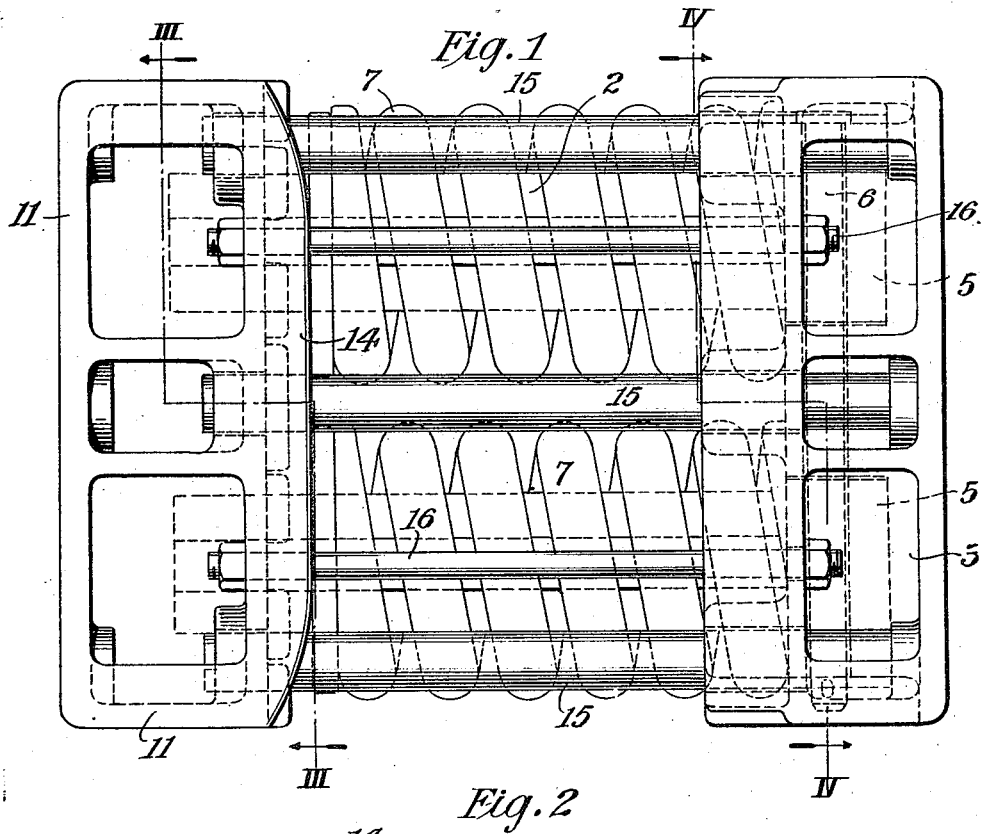
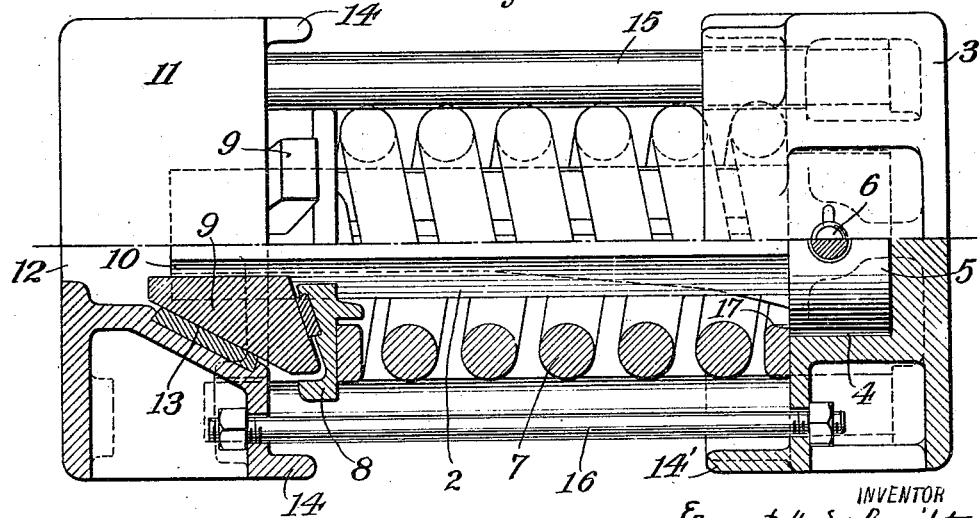
INVENTOR
Ernest H. Schmidt
BY
Clarence D Kerr
ATTORNEY May 27, 1924.　　　　　　　　　　　　　　　　　1,495,263
E. H. SCHMIDT
SHOCK ABSORBING MECHANISM
Filed April 5, 1920　　　2 Sheets-Sheet 2

INVENTOR
Ernest H. Schmidt
BY
Clarence O. Kerr
ATTORNEY

Patented May 27, 1924.

1,495,263

UNITED STATES PATENT OFFICE.

ERNEST H. SCHMIDT, OF CLEVELAND HEIGHTS, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

SHOCK-ABSORBING MECHANISM.

Application filed April 5, 1920. Serial No. 371,302.

*To all whom it may concern:*

Be it known that I, ERNEST H. SCHMIDT, a citizen of the United States, residing at Cleveland Heights, Cuyahoga County, Ohio, have invented new and useful Improvements in Shock-Absorbing Mechanism, of which the following is a specification, reference being had to the accompanying drawings, in which—

Figure 3:
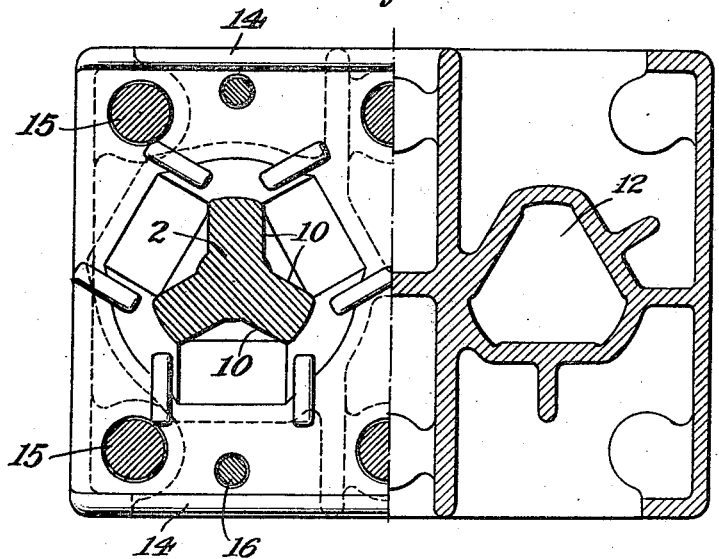
Figure 4:
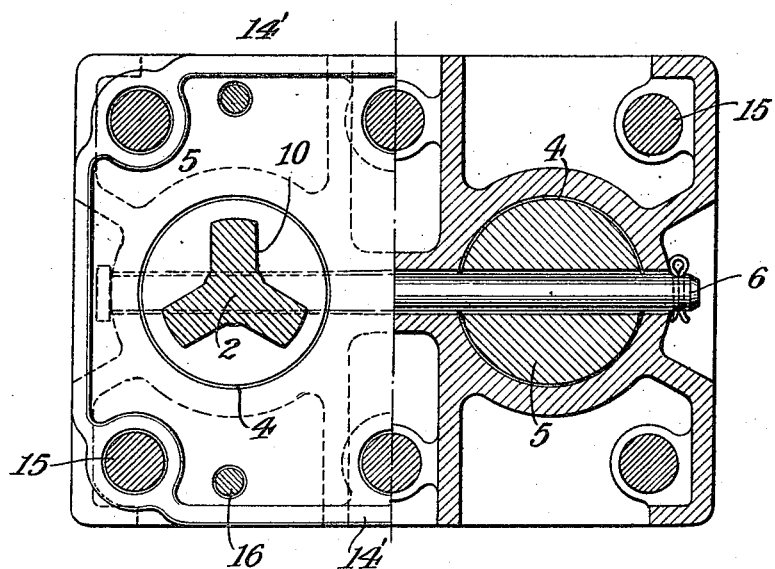

Fig. 1 is a plan of a shock absorbing mechanism embodying my invention; Fig. 2 is a side elevation thereof partly in section; and Figs. 3 and 4 are sections respectively on lines III—III and IV—IV of Fig. 1.

My invention relates to shock absorbing mechanisms for railway cars and comprises a plurality of included friction members, a plurality of sets of including friction shoes arranged about the friction members, and followers, each of which followers cooperates with more than one of the friction members.

My invention also consists in the construction and arrangement of parts which I shall hereinafter describe and claim.

Referring to the drawings, 2 indicates friction members of the included or plunger type, of which I have shown two, and 3 is the base or rear follower, having recesses 4 in which cylindrical extensions 5 of the members 2 fit loosely. The extensions 5 of the members 2 are held in position by means of a pin 6 which passes through aligned apertures in the base 3 and extensions 5.

About each included member 2 is arranged a compression spring 7 bearing at one end against the base 3, an intermediate follower 8 bearing on one side against the opposite end of the spring 7 and at its other side against a plurality of friction shoes 9 seating between the longitudinally tapered arms 10 of the included member 2. Engaging both sets of friction shoes 9 is a wedge or front follower 11 which has apertures 12 through which each included member operates. The wedge has inclined faces 13 which engage correspondingly inclined faces on the friction shoes. The wedge is also provided with a pair of ribs 14 to reinforce it against bending.

The gear is provided with buffing columns 15 designed to take up and transmit excessive buffing stresses and thereby prevent damage to the gear. Retaining bolts 16 are also provided, so that the various parts may not only be held together but the whole gear placed under slight initial compression.

In the operation of the device the front follower or wedge 11, as it is driven inwardly, forces the friction shoes 9 in between the arms of the included members and moves them rearwardly, which carry with them the intermediate followers 8, and their rearward movement is resisted by the compression springs 7, which are held from movement to the rear by the base 3. The cylindrical extensions 5 of the members 2 have a loose fit in the recesses 4 of the base member, so as to permit them to adjust themselves by lateral movement to any variation in the distance between the sets of wedging faces 13 in the wedge 11.

As the pressure abates the positive release of the shoes 9 is effected by means of the intermediate follower 8, which tilts the shoes 9 away from the included member 2 and permits the spring 7 to restore the shoes and wedge to normal position, as is described and claimed in my Letters Patent No. 1,243,227, dated October 16, 1917.

The base 5 of each central member 2 is somewhat enlarged so that the spring 7 will bear upon the shoulders 17 thus formed as well as upon the surface of the member 3 and thus assist the pin 6 in holding the central members securely in place during the release movement of the parts.

I have found that I can construct a twin gear such as I have described of the same length and height as a single gear of a similar design, and of a width considerably less than twice the width of a single gear. The capacity is approximately twice that of a single gear of the same design, but with a weight of very much less than twice the weight of a single gear.

My invention is applicable to railway vehicles, and particularly to very heavy freight cars, which require draft gears of extraordinary capacity.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In shock absorbing mechanism for railway cars, a base member having loosely secured thereto a plurality of included friction members, a set of friction shoes engaging each of said friction members, a wedge follower cooperating with the sets of friction shoes, and compression springs adapted to resist the movement of the shoes relative to the respective included friction members in one direction.

2. In shock absorbing mechanism for railway cars, a base member, included friction members loosely seating in recesses in the base member and arranged to move laterally in said recesses, friction shoes engaging each of said included friction members, and a wedge follower engaging the said shoes.

3. In shock absorbing mechanism for railway cars, a base member having a pair of included friction members loosely secured thereto being adapted for limited lateral movement, friction shoes arranged around each friction member, a compression spring arranged about each friction member and between the shoes and the base, and a wedge follower having wedge faces adapted to engage friction shoes arranged about each included friction member.

4. In shock absorbing mechanism for railway cars, a base member, included friction members having cylindrical extensions loosely seating in recesses in the base members, means independent of the spring for retaining the extensions in said recesses, friction shoes engaging the included friction members, a spring between said base member and friction shoes, and a wedge follower engaging said friction shoes.

5. In shock absorbing mechanism for railway cars, a base member, an included friction member seated in a recess in the base member including friction shoes, and a compression spring arranged about the friction member and engaging said member and base.

6. In shock absorbing mechanism for railway cars, a base member, an included friction member having shouldered extensions seating in the base member, friction shoes arranged about said friction member and a compression spring engaging said shoulder and base, said spring being adapted to hold the friction member in operative relation with the base.

ERNEST H. SCHMIDT.